MEMORY ELEMENT HAVING TWO ORTHOGONALLY DISPOSED MAGNETIC FILMS

Filed April 6, 1964 2 Sheets-Sheet 1

INVENTORS
HSU CHANG
EUGENE R. GENOVESE

BY Stephen J. Limanek
ATTORNEY

Aug. 12, 1969 HSU CHANG ET AL 3,461,438

MEMORY ELEMENT HAVING TWO ORTHOGONALLY DISPOSED MAGNETIC FILMS

Filed April 6, 1964 2 Sheets-Sheet 2

United States Patent Office 3,461,438 Patented Aug. 12, 1969

3,461,438

MEMORY ELEMENT HAVING TWO ORTHOGONALLY DISPOSED MAGNETIC FILMS

Hsu Chang, Peekskill, and Eugene R. Genovese, Yorktown Heights, N.Y., assignors to International Business Machines Corporation, Armonk, N.Y., a corporation of New York Filed Apr. 6, 1964, Ser. No. 357,417
Int. Cl. G11b 5/02
U.S. Cl. 340—174 11 Claims

ABSTRACT OF THE DISCLOSURE

The invention relates to a coupled magnetic film memory element in which two magnetic films are orthogonally disposed and in contact along the opposite edges of one film over a length which corresponds to the width of the other film. A bit-sense conductor is disposed along the length of one of the films and between the two films at their intersection. The magnetic films have a common easy axis in the direction of the width of one of the films and are closely spaced (preferably less than 1/20 the width of the coupled film) to provide magnetostatic coupling which substantially eliminates demagnetizing fields in each of the magnetic films. One beneficial effect of providing contact of the films at their intersection which produces demagnitized strips extending along the edges of the coupled films perpendicular to the easy axis of the film is that domains are anchored and a virtually creep free magnetic film memory element results. A storage system incorporating these memory elements as an array is also disclosed.

A toroidal magnetic core having a square hysteresis loop can be switched by applying simultaneously thereto two magnetic field pulses, while the application of either of the two pulses any number of times does not affect the magnetic state of the core. It is known that the simultaneous application of two half-select magnetic field pulses to a magnetic film having uniaxial anisotropy, or an easy axis, switches or reverses the magnetic state of the film and that often repeated applications of one of the two half-select pulses also causes, by a creeping action, a switching or destruction of the stored information in a film. This undesired creeping, which is a domain wall creeping, in magnetic storage films is brought about in magnetic film memory systems by disturb magnetic fields, which include the partial or half-select fields and stray fields.

One of the more serious problems at the present time with the development of magnetic film memories is the relatively high disturb fields encountered in large arrays having film elements driven by the simultaneous application of mutually perpendicular or orthogonal magnetic fields, one of which is a strong word field. These high disturb fields have been a serious obstacle in the general acceptance of magnetic films for use in reliable memory systems.

In the presently used memory film elements having an easy axis, a "0" bit of information is represented by magnetization of the film element in one direction of the easy axis and a "1" bit of information is represented by magnetization in the opposite easy direction. In an array employing word and bit lines, under the influence of small word fields, due to the drive currents in activated neighboring word lines, and due to bit fields and demagnetized fields, the domain walls in reversed domains at the edge of a discrete bit, or defining the boundaries of a bit in a continuous strip or sheet, will be moved gradually.

Since this disturbed state of the film usually has no relationship to the original "0" or "1" bit of information, information stored in the film is generally lost. In an attempt to overcome the loss of information by the disturb fields, it has been suggested to choose the dimensions, thickness, the critical field and rotational threshold of the film such that the disturb sensitivity decreases to a tolerable limit.

In order to produce magnetic film memories wherein the disturb sensitivity decreases to a tolerable limit, considerable care must be exercised in the production of each layer of material employed regardless of whether it be a magnetic strip or dot, an insulator or a conductor. Unless the magnetic film memory plane is properly fabricated not only is there encountered the creeping problem, but also a lack of uniformity of output voltage from one bit position to another.

It is an object of this invention to provide a magnetic coupled film storage system in which creep in its films is substantially reduced or eliminated.

Another object of this invention is to provide a coupled magnetic film storage system in which disturb fields applied to the films do not destroy information stored in the films.

Yet another object of this invention is to provide a coupled magnetic film storage system which is easier to fabricate than have prior coupled magnetic film systems.

In accordance with the present invention a magnetic film storage system is provided which includes a pair of substantially flat films having overlapping edges in a demagnetized state with the portion of the pair of films between the demagnetized edges having antiparallel magnetization for storing information in a coupled film arrangement.

An important advantage of this invention is that creep free magnetic film systems are provided which are simple to construct.

An important feature of this invention is that the storage elements of the system are fabricated simply without a critical alignment by depositing sequentially magnetic layers through two masks substantially orthogonally arranged.

The foregoing and other objects, features and advantages of the invention will be apparent from the following more particular description of preferred embodiments of the invention, as illustrated in the accompanying drawings.

In the drawings:

FIG. 1 illustrates an embodiment of the magnetic film storage system of the present invention showing only one storage film element thereof.

FIG. 1*a* illustrates an enlarged view of the top surface of the storage film element of the system shown in FIG. 1.

Figure 1:
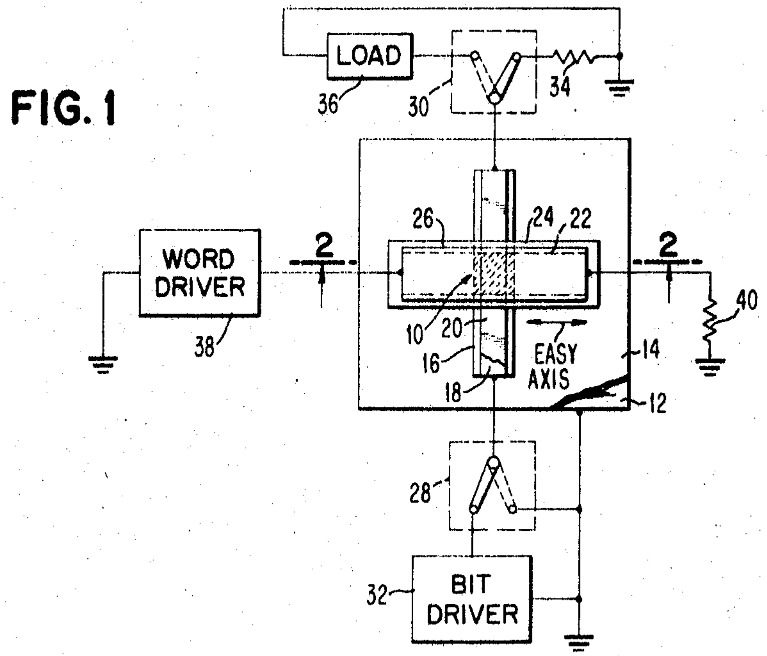
Figure 2:
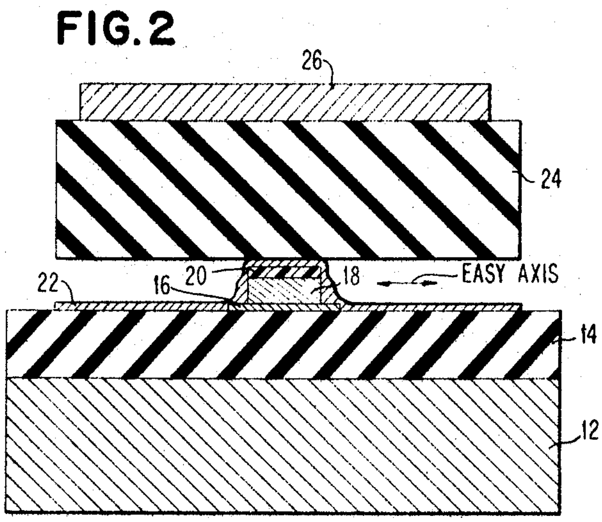
FIG. 2 is a cross-sectional view of the storage film element of the system illustrated in FIG. 1 taken through line 2—2.
Figure 1A:
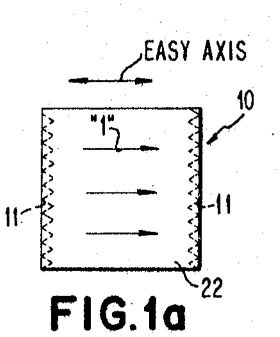

Referring to the drawings in more detail, there is shown in FIGS. 1, 1*a* and 2 an embodiment of the magnetic film storage system of the present invention which for purposes of illustration only is limited to a single magnetic coupled film 10. The coupled film 10 is formed on a substrate 12 which is preferably an electrically conductive ground plane on which is deposited a first layer of insulating material 14, for example, silicon monoxide. Deposited on the insulating layer 14 through a suitable mask in the presence of a given magnetic field is a first strip of magnetic material 16, for example, of permalloy about 2,000

Angstroms thick, forming the bottom layer of the coupled film 10. The given magnetic field is directed substantially transversely of the magnetic strip 16 to establish an easy axis in the strip 16 in the direction of the magnetic field, as indicated in FIGS. 1, 1*a* and 2. A flat strip of electrically conductive material 18 which may be used as a bit and sense line having a width slightly less than that of the magnetic layer 14 is disposed on the magnetic strip 16. A second layer of insulation 20 is deposited on the conductive strip 18. A second strip of magnetic material 22, for example, of permalloy about 2,000 Angstroms thick, deposited on the first and second insulating layers 14 and 20 and on the edges of the first magnetic strip 16 and of the first conductive strip 18 in a direction orthogonal to the direction of the first magnetic strip 16 through a suitable mask in the presence of the given magnetic field forms the upper layer of the coupled film 10. Disposed over the second strip of magnetic material 22 is a third layer of insulating material 24 which may be made of, for example, Mylar. A second electrically conductive strip 26 is disposed on the third layer of insulation 24 above the second magnetic strip 22 and orthogonally arranged with respect to the first conductive strip 16. The second conductive strip 26 may be used as a word line for the storage or memory system.

The first conductive strip or bit line 18 is connected at one end to a first switching means 28 and at the other end to a second switching means 30. The first switching means 28 is operative to connect one end of the bit line 18 either to a bit line driver or generator 32 or to ground or the conductive substrate 12, while the second switching means 30 is operative to connect the other end of the bit line 18 either to ground through a bit line terminating impedance 34 or to a load 36, which may be a conventional sense amplifier. One end of the second conductive strip or word line 26 is connected to a word line driver 38 and the other end of the word line 26 is connected through a word line terminating impedance 40, which is preferably the characteristic impedance of the word line 26, to ground. The first and second switching means 28 and 30 are preferably ganged so that when the one end of the bit line 18 is connected to the bit line driver 32 by the first switching means 28, the other end of the bit line 18 is connected to ground through the impedance 34 by the second switching means 30, and when the other end of the bit line 18 is connected by the second switching means 30 to the load 36, the one end of the bit line 18 is connected by the first switching means 28 to ground. By providing the first and second switching means 28 and 30 in the system of the present invention, the bit line 18 may be used as a common bit and sense line. If the switching means 28 and 30 are not used, an additional line similar to the bit line may be provided as a sense line. When the substrate 12 is a ground plane, as illustrated in FIG. 1, it is used as the return path for the bit and word lines.

Figure 3:
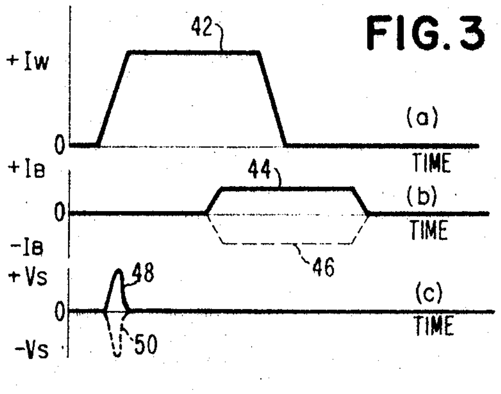
FIG. 3 illustrates a pulse program for the system shown in FIG. 1.

FIG. 3 of the drawing shows a pulse program which may be used in connection with the operation of the system shown in FIGS. 1, 1*a* and 2 of the drawing.

In the operation of the embodiment illustrated in FIGS. 1, 1*a* and 2 of the drawing, to store information in the magnetic coupled film 10, a positive pulse of current 42 indicated in FIG. 3 at (*a*) is passed through the word line 26 from the word line driver 38 of FIG. 1 to provide a magnetic field in the coupled film 10 which is perpendicular to the easy axis of the film 10, that is, in the direction of the hard axis of the coupled film 10, and a positive or negative pulse 44 or 46 of current, indicated in FIG. 3 at (*b*), is passed through the bit line 18 from the bit line driver 32 to provide a magnetic field in the coupled film 10 along the easy axis thereof. It can be seen that the current pulse 42 in the word line 26 produces a magnetic field in the bottom and top layers of the coupled film 10 which orients the magnetization in the coupled film 10 in a direction perpendicular to the easy axis of the film 10, that is, the hard axis. Accordingly, when only a magnetic field produced by the word current pulse 42 is applied to the coupled film 10, the magnetization of the film 10 is indicative of neither a "0" or a "1" bit of information. However, when current is passed concurrently through the word line 26 and the bit line 18, the magnetization of the coupled film 10 is disposed in a direction located at an angle to the hard direction at one side or the other in each layer 16 and 22 thereof depending upon whether a positive pulse 44 or a negative pulse 46 is passing through the bit line 18. To write a "1" into the coupled film 10, a positive current pulse 42 from the word line driver 38 is applied to the word line 26 and concurrently therewith the positive current pulse 44 from bit line driver 32 is applied to the bit line 18. The positive word current pulse 42 is terminated prior to the termination of the positive bit current pulse 44. When only a field produced by the positive word current pulse 42 is applied to the coupled film 10, the magnetization in both the top and bottom layers 16 and 22, respectively, of the coupled film 10 may be considered to be in an upwardly vertical direction. When a magnetic field is thereafter concurrently produced by the positive bit current pulse 44, the magnetization is rotated in a clockwise direction in the top layer 22 and counter-clockwise in the bottom layer 16 of the coupled film 10 toward the horizontal direction, that is, toward the easy axis of the coupled film 10. When the positive word current pulse 42 is terminated, the magnetization in the upper layer 22 is established horizontally to the right, as indicated in FIG. 1*a* of the drawing, and in the bottom layer 16 horizontally to the left, i.e., antiparallel with respect to the magnetization in the upper layer 22. To store a "0" bit of information in the system illustrated in FIGS. 1, 1*a* and 2 of the drawing, the operation is similar to that described hereinabove in connection with a storage of a "1" bit of information except that a negative bit current pulse 46 from bit driver 32 is passed through the bit line conductor 18 to produce a magnetic field in the coupled film 10 which rotates the magnetization in the top layer 22 in a counter-clockwise direction while rotating the magnetization of the bottom layer 16 in a clockwise direction toward the easy axis of the coupled film 10. When the coupled film 10 is storing a "0" bit of information, the direction of the magnetization of the top and bottom layers are opposite to that when a "1" bit of information is stored. Reading the information stored in the coupled film 10 is accomplished by connecting the load 36 to the first conductive line 18 and passing a word current $I_w$, indicated in FIG. 3 at (*a*), through the word line 26. The output pulses indicated in FIG. 3 at (*c*) are bipolar, a positive voltage 48 representing a "1" bit of information and a negative voltage 50 representing a "0" bit of information.

By providing a coupled film with top and bottom layers closely spaced, i.e., by substantially only a single conductive drive line, the magnetostatic coupling substantially eliminates the demagnetizing fields in each of the layers 16 and 22 of the coupled film 10. To achieve this condition the separation between the magnetic layers 16 and 22 should be less than $\frac{1}{20}$ of the width of the coupled film in the direction of its easy axis, with the bit length in the hard direction at least as long as the bit width. Furthermore, by extending the magnetic layers 16 and 22 of the coupled film 10 beyond the first conductive strip 18 at the two opposite sides thereof and joining or contacting one another along the two sides in an overlapping arrangement, substantially demagnetized edges 11, indicated in FIG. 1*a* of the drawing, at the overlapping sections of the coupled film 10 are formed which function as an anchor for the boundary domain walls established in the layers 16 and 22 across the film strip width between the demagnetized edges.

The demagnetization or edge effect at the edges of the two layers 16 and 22 of magnetic material at their regions of overlap can be explained in the following manner. Due to strong exchange coupling, at any one point in the overlap regions 11, the magnetization in the top and bottom layers 16 and 22 of the coupled film 10 are parallel instead of antiparallel. However, at two adjacent points magnetization may be in opposite directions to produce in the two overlapping edges 11 effectively a demagnetized state. On the other hand, the portions of the top and bottom layers 16 and 18 between the two overlapping edges 11 which are separated by the first conductive line 18 have antiparallel magnetizations for the top and bottom magnetic layers and exhibit edge domains of only about 1/10 the size observed in single films, i.e., about 1 micron in diameter, indicating considerable cancellation of demagnetizing fields through close spacing, for example, less than 2 microns, of the magnetic layers 16 and 22 with the antiparallel magnetizations. It should be noted that this cancellation is produced despite the ineffectiveness of the overlapping edges 11 which have an easy axis corresponding to that of the layers 16 and 22 to provide complete flux closure. The overlapping edges 11 are relatively immune to disturb fields since the bit current tends to move the top and bottom portions of a domain wall in the overlapping edges in opposite directions and, thus, the two opposite forces tend to cancel each other. Besides, the film property especially the coercive field depends on film thickness and on the layer conditions. Higher coercive fields can usually be maintained for the edges. The domain walls in the central portions of the layers 16 and 22 defining an item of information either directly extend into the edges 11 or diffuse into the edges 11 through curling. In either case, the edges 11 serve as anchors for these domain walls and prevent them from moving. In wide magnetic strips this effect is manifested by wall bending or bowing at the edges of the coupled film 10 parallel to the easy axis thereof.

It can be seen that the coupled film 10 is fabricated essentially by merely depositing a first magnetic strip on a substrate, depositing a conductive strip of a width slightly less than that of the first strip onto the first strip and then depositing a second magnetic strip over the conductive strip in a direction only substantially perpendicular to the direction of the first magnetic and conductive strips. More specifically the effective storage area of the coupled film 10 is defined by the width of the conductive strip and the width of the second magnetic strip. It should be noted that variation of even a few degrees in the direction of the second magnetic strip with respect to the normal of the conductive strip or the first magnetic strip will not appreciably change the geometry of the coupled film 10. Thus, a high degree of precision in the positioning of, for example, masks in the fabrication of the coupled films of the present invention is not required to provide relatively uniform storage elements in an array. To make two or more strips of different widths, such as, magnetic strip 16 and conductive strip 18, with the use of a single mask in an evaporation system, it is only necessary to provide different beam angles from the different material sources.

In the system illustrated in FIGS. 1, 1*a* and 2 of the drawing output voltages in the sense line 18 applied to the load 36 of 10 millivolts are produced when word currents $I_w$ of 0.5 ampere and bit currents $I_b$ of 0.030 ampere are supplied to the word line 26 and bit line 18, respectively, and when each of the layers 16 and 22 of the coupled film 10 is 0.020 inch x 0.040 inch x 2,000 Angstroms having an anisotropy field $H_k$ of 4 oersteds and a coercive force of 3 oersteds.

Although the first magnetic strip 16 was deposited on the first insulation layer 14 prior to the application of the first conductive strip 18, it should be understood that the second magnetic strip 22 can be deposited on the first insulation layer 14 prior to the application of the first conductive strip 18 and the first magnetic strip 16 be used as the top layer of the coupled film 10, if desired. Furthermore, it may be preferred that the layers 16 and 22 of the coupled film 10 form a rectangle with the long dimension parallel to the hard axis of the film 10 to decrease the demagnetizing field during the read out operation of the film 10.

The first conductive strip 18, which is made of material having a resistivity approximately ten times less than that of the magnetic material of the first and second magnetic strips 16 and 22, need not be surrounded completely with insulation material but it has been found preferable to provide an insulation layer 20 between only the first conductive strip 18 and the second magnetic strip 22 to provide a smoother underlayer for the top magnetic layer 22.

A thickness of 2,000 Angstroms has been suggested hereinabove for the top and bottom layers 22 and 16, respectively, of the coupled film 10, however, thicknesses between 10,000 and 20,000 Angstroms may be used if desired, the thickness being limited only by fabrication and eddy current considerations.

Figure 4:
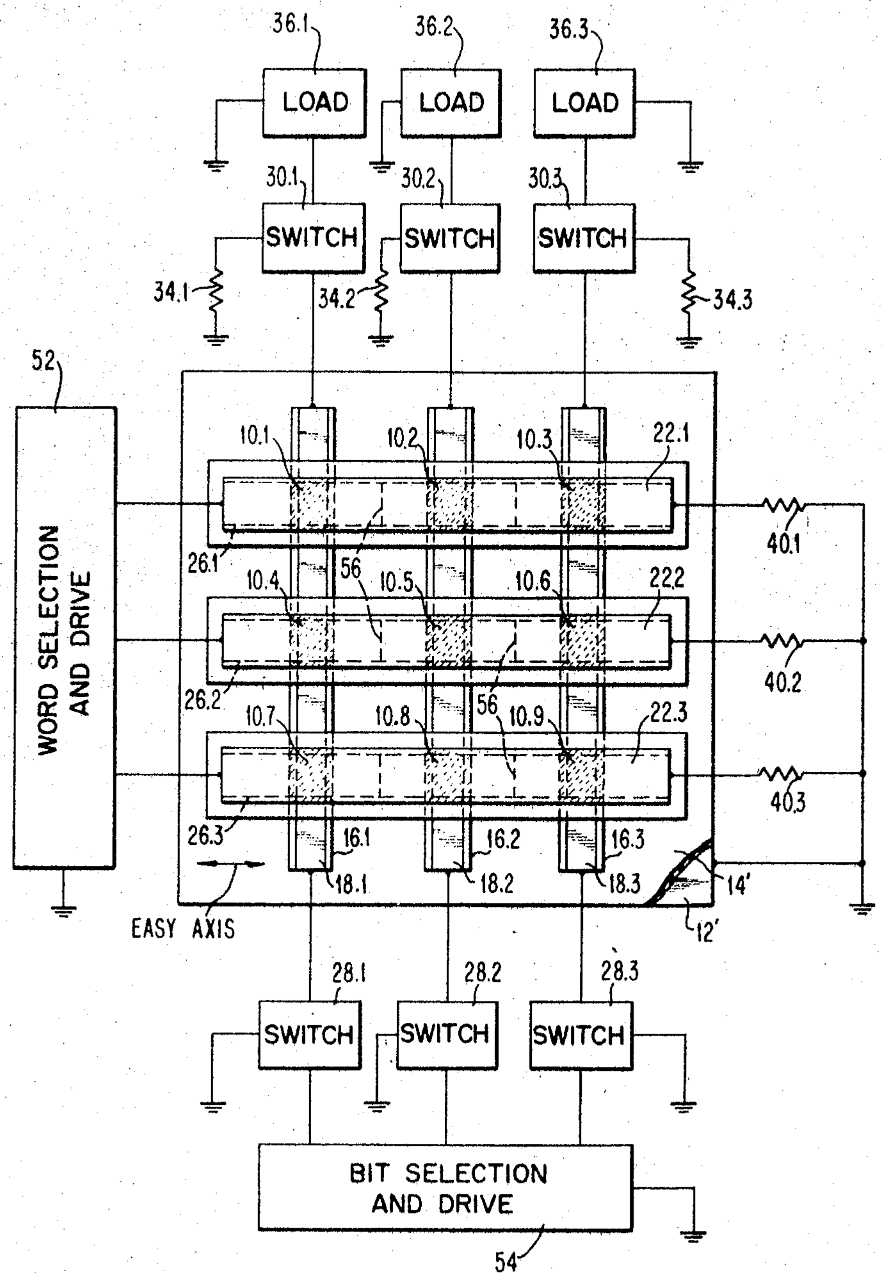
FIG. 4 shows a magnetic film storage system of the present invention which includes a planar array having a plurality of film elements.

In FIG. 4 of the drawing there is illustrated an embodiment of the present invention which includes a planar array of a plurality of coupled films 10.1 to 10.9. The system is word organized having a plurality of horizontal word lines 26.1, 26.2 and 26.3 and a plurality of vertical bit lines 18.1, 18.2 and 18.3. The bit lines 18.1, 18.2 and 18.3 are disposed on first magnetic film strips 16.1, 16.2 and 16.3, respectively, and the word lines 26.1, 26.2 and 26.3 are disposed over second film strips 22.1, 22.2 and 22.3 which are all supported on a conductive substrate 12′ and an insulation layer 14′ in a manner similar to that described hereinabove in connection with the description of the system illustrated in FIGS. 1, 1*a* and 2 to form the coupled films 10.1 to 10.9.

The word lines 26.1, 26.2 and 26.3 are each connected at one end to a word selection and drive means 52 and at the other end to ground through word line terminating impedances 40.1, 40.2 and 40.3, respectively. The word selection and drive means 52 provides address selection of a particular word line 26.1, 26.2 or 26.3 and pulse generation corresponding to the word line driver 38 of the system of FIGS. 1, 1*a* and 2. The bit lines 18.1, 18.2 and 18.3 passing between the top and bottom magnetic layers of aligned coupled films 10.1, 10.4 and 10.7, 10.2, 10.5 and 10.8 and 10.3, 10.6 and 10.9, respectively, are connected to bit selection and drive means 54 through a respective switch 28.1, 28.2 and 28.3 and are further connected at the opposite end to loads 36.1, 36.2 and 36.3 through a respective switch 30.1, 30.2 and 30.3. The means 54 provides the function of bit addressing and pulse generation corresponding to the bit line driver 32 of the system of FIGS. 1, 1*a* and 2, while each switch 28.1, 28.2 and 28.3 corresponds to the switch 28 and each switch 30.1, 30.2 and 30.3 corresponds to the switch 30 of FIG. 1. When the resistivity of the magnetic material of the magnetic strips is low, the strips may be cut as indicated at 56 to increase the impedance through the magnetic strips between adjacent conductive strips. Another method to electrically isolate neighboring lines is to deposit the horizontal magnetic lines in discrete bits.

In the operation of the system illustrated in FIG. 4 of the drawing when "1" and "0" bits of information are to be written into the coupled films of a word line, for example, into films 10.4, 10.5 and 10.6 of the word line 26.2, the word selection and drive means 52 is operated to pass a current corresponding to the current indicated at 42 of FIG. 3, at (*a*) of the drawing through the word line 26.2 and the bit selection and drive means 54 is operated to pass through the bit lines 18.1, 18.2 and 18.3 current which may be related in time to the current in the word line 26.2 as indicated at 44 and 46 in FIG. 3 of the drawing and having polarities corresponding to the bit or digital information to be stored in the coupled films 10.4, 10.5 and 10.6, in the manner described hereinabove in connection with the writing of "1" and "0" bits of information in the system of FIGS. 1, 1a and 2. When information stored in the coupled films 10.4, 10.5 and 10.6 is to be readout, the word selection and drive means 52 is operated to pass a current through the word line 26.2 to orient the magnetization in the coupled films 10.4, 10.5 and 10.6 in the hard direction. When a destructive read operation is desired, a current having a magnitude sufficient to orient the magnetization completely in the hard driection is passed through the word line 26.2. When a nondestructive read operation is desired, a current having a magnitude less than that which would completely magnetize both the top and bottom layers of the coupled films 10.4, 10.5 and 10.6 in the hard direction is passed through the word line 26.2. The output signals indicative of the stored information in the coupled films 10.4, 10.5 and 10.6 of the word line 26.2 are bipolar as stated hereinabove in connection with the description of FIG. 1 and are applied to their respective loads 36.1, 36.2 and 36.3, which may be a conventional sense amplifier, by the proper operation of the switches 28.1, 28.2, 28.3, 30.1, 30.2 and 30.3. Information is written into and read out of the coupled films 10.1, 10.2, 10.3 and 10.7, 10.8 and 10.9 associated with the word lines 26.1, and 26.3, respectively, in a similar manner as described hereinabove with the handling of information in the word line 26.2 by the proper operation of the word and bit selection and drive means 52 and 54.

It can be seen in FIG. 4 of the drawing that an unselected bit or coupled film is subjected to the full bit field and to a stray field from selected neighboring word lines. Under the influence of such repeated disturb field the reverse edge domains grow and finally eliminate the original stored information in conventional magnetic films. However, with the removal of the word line from within the coupled films of the system of this invention, the magnetostatic coupling is increased to provide a coupled film with less disturb sensitivity and with the addition of the demagnetized strips extending along the edges of the coupled films perpendicular to the direction of the easy axis of the films to anchor the storage domains, a virtually creep free magnetic film memory system is provided which has a very high packing density.

It should be understood that the teachings of the present invention are applicable to systems having two or three dimensional magnetic memory arrays and to arrays having conductive or non-conductive substrates and that the invention is not limited to any particular mode of operation, since, for example, storage may be performed by processes other than the rotational processes described hereinabove. It should also be understood that bipolar or unipolar writing processes may be used in the invention. Furthermore, the magnetic material of the coupled films may be made of any desired material although permalloy is preferred and the material of the conductive strips may be, for example, silver, copper, aluminum or gold.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A storage system comprising:

(a) a coupled film including a pair of anisotropic magnetic layers each of a given width contacting each other at opposite edges thereof perpendicular to the direction of the width and being spaced apart at the remaining portions thereof by a distance less than one twentieth of the given width, said layers having a common easy axis along the direction of said width, and (b) means including a given conductor interposed between said pair of magnetic layers for storing information in said coupled film.

2. A device comprising:

(a) a coupled film including a pair of anisotropic magnetic layers having a common easy axis and a given width in the direction of the easy axis spaced apart by a distance less than one twentieth of said given width, the length of each of said layers being at least as long as said width, and (b) means for storing information in said film including a first conductor interposed between said layers for carrying a first current therethrough and a second conductor disposed without said film in a magnetically coupled relationship thereto arranged perpendicular to said first conductor.

3. A storage system as set forth in claim 1 wherein the length of each of the layers of said film in a direction perpendicular to the direction of the easy axis is at least as long as said given width.

4. A storage system as set forth in claim 3 wherein said information storing means further includes:

(a) a second conductor disposed perpendicular to said given conductor without said coupled film in a magnetically coupled relationship with respect to each of said layers.

5. A storage system as set forth in claim 4 further including:

(a) first and second insulating layers each having a smooth surface, one of said pair of magnetic layers being disposed in contact with the smooth surface of said first insulating layer and the other of said pair of magnetic layers being disposed in contact with the smooth surface of said second insulating layer.

6. A storage system as set forth in claim 5 further including:

(a) means for sensing the information stored in said coupled film, said sensing means including said given conductor.

7. A storage system comprising:

(a) a first set of a first given plurality of parallel strips of anisotropic magnetic material, each strip having a given width, (b) a first set of a first given plurality of parallel strips of electrically conductive material, each of said conductive strips having a width less than said given width and being centrally disposed with respect to a different one of said magnetic strips, (c) a second set of a second given plurality of parallel strips of anisotropic magnetic material disposed substantially orthogonally with respect to said first magnetic strip set, said first conductive strips being interposed between said first and second magnetic strip sets, each of said second set magnetic strips being in contact with each of said first set magnetic strips at each edge of each of said conductive strips, said magnetic strips having an easy axis in the direction of said given width, said first and second set magnetic strips are spaced apart at said conductive strips by a distance less than one twentieth of said given width, and (d) means including said first set of conductive strips for selectively orienting the magnetization in said magnetic strips at the intersections thereof.

8. A storage system as set forth in claim 7 wherein each of said sets is coplanarly arranged.

9. A storage system as set forth in claim 7 further including:

(a) a first layer of insulation material having a smooth surface, and (b) a first set of insulating strips having a smooth surface, said first set of magnetic strips being disposed on the smooth surface of said first layer of insulation and said second set of magnetic strips being disposed on the smooth surfaces of said insulation strips.

10. A storage system as set forth in claim 9 wherein said magnetization orientation means further includes:

(a) a second set of said second given plurality of conductive parallel strips disposed without and magnetically coupled to said first and second magnetic strip sets, said second conductive strip set being arranged orthogonal to said first conductive strip set.

11. A storage system as set forth in claim 10 further comprising:

(a) means including said first conductive strip set for selectively sensing the direction of orientation of the magnetization in said first and second magnetic strip sets at said first set conductive strips.

References Cited

UNITED STATES PATENTS 3,278,913 10/1966 Raffel ------------- 340—174

FOREIGN PATENTS 367,854 4/1963 Switzerland.

STANLEY M. URYNOWICZ, Jr., Primary Examiner